US006996635B2

(12) United States Patent
Goodman et al.

(10) Patent No.: US 6,996,635 B2
(45) Date of Patent: Feb. 7, 2006

(54) APPARATUS AND METHOD TO ACTIVATE TRANSPARENT DATA STORAGE DRIVE FIRMWARE UPDATES

(75) Inventors: Brian G. Goodman, Tucson, AZ (US); Leonard G. Jesionowski, Tucson, AZ (US); Robin D. Roberts, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 10/646,088

(22) Filed: Aug. 22, 2003

(65) Prior Publication Data

US 2005/0044278 A1     Feb. 24, 2005

(51) Int. Cl.
*G06F 3/00*     (2006.01)
(52) U.S. Cl. ............................................. 710/5
(58) Field of Classification Search ............. 710/5, 710/8; 711/100, 103; 717/168, 173, 174
See application file for complete search history.

(56) References Cited

U.S. PATENT DOCUMENTS

| | | | | |
|---|---|---|---|---|
| 5,210,854 A * | 5/1993 | Beaverton et al. | ........... | 717/174 |
| 5,732,275 A * | 3/1998 | Kullick et al. | ............... | 717/170 |
| 5,974,544 A | 10/1999 | Jeffries et al. | ................. | 713/1 |
| 6,044,461 A * | 3/2000 | Agha et al. | ..................... | 713/1 |
| 6,073,232 A | 6/2000 | Kroecker et al. | ............... | 713/1 |
| 6,237,091 B1 * | 5/2001 | Firooz et al. | .................. | 713/1 |
| 6,253,281 B1 * | 6/2001 | Hall | ........................... | 711/112 |
| 6,266,736 B1 * | 7/2001 | Atkinson et al. | ........... | 711/103 |
| 6,317,815 B1 | 11/2001 | Mayer et al. | ............... | 711/165 |
| 6,356,977 B2 | 3/2002 | Ofek et al. | ................. | 711/112 |
| 6,363,457 B1 | 3/2002 | Sundberg | ..................... | 711/114 |
| 6,560,703 B1 | 5/2003 | Goodman | ...................... | 713/2 |
| 6,594,757 B1 * | 7/2003 | Martinez | ........................ | 713/2 |
| 6,675,258 B1 * | 1/2004 | Bramhall et al. | ........... | 711/114 |
| 6,728,833 B2 * | 4/2004 | Pruett et al. | ................. | 711/114 |
| 6,754,895 B1 * | 6/2004 | Bartel et al. | ................. | 717/171 |
| 6,772,273 B1 * | 8/2004 | Tedrow et al. | .............. | 711/103 |
| 2002/0073413 A1 | 6/2002 | Goodman | ..................... | 171/172 |
| 2002/0166027 A1 * | 11/2002 | Shirasawa et al. | .......... | 711/114 |
| 2003/0066065 A1 * | 4/2003 | Larkin | ........................ | 717/177 |
| 2003/0163508 A1 * | 8/2003 | Goodman | .................... | 709/100 |
| 2003/0163640 A1 * | 8/2003 | Pruett et al. | ................. | 711/114 |
| 2004/0107416 A1 * | 6/2004 | Buban et al. | ................ | 717/170 |
| 2004/0197073 A1 * | 10/2004 | Oesterreicher et al. | ....... | 386/46 |

OTHER PUBLICATIONS

International Business Machines Corporation, "z/OS V1R3 DFSMS Introduction", 1980, 2002, pp. 1-140.

* cited by examiner

*Primary Examiner*—Henry W. H. Tsai
*Assistant Examiner*—David Martinez
(74) *Attorney, Agent, or Firm*—Dale F. Regelman

(57) ABSTRACT

A method to activate a code update in a data storage drive. The method provides a code update to the data storage drive while the data storage drive performs normal drive operations. The method then detects a host computer transparent event, and activates the code update during that host computer transparent event.

15 Claims, 11 Drawing Sheets

APPARATUS AND METHOD TO ACTIVATE TRANSPARENT DATA STORAGE DRIVE FIRMWARE UPDATES

FIELD OF THE INVENTION

The present invention relates to data storage devices for dynamic information storage or retrieval. More particularly, the invention concerns a method to perform and activate a transparent firmware update in a data storage device.

BACKGROUND OF THE INVENTION

Data storage devices are known for providing cost effective storage and retrieval of data. Data storage devices may comprise removable media drives such as tape drives, optical disk drives, electronic media drives, removable hard disk drives, etc. Data storage devices may also comprise fixed media drives such as hard disk drives, electronic media drives, etc. Herein, drive, data storage drive, and data storage device are used interchangeably. As customer expectations move toward a concept of continuous availability, such as the well known "24×7×365" availability, it is increasingly important that routine service actions do not disrupt customer operations. This is especially important when the data storage device is part of a larger storage subsystem, such as a RAID (Redundant Array of Independent Drives) subsystem, an automated data storage library, a virtual tape system, etc. Herein, subsystem and storage subsystem are used interchangeably.

Firmware update of data storage drives is a fairly common practice for fixing problems or for providing new features or functionality. Prior art methods, however, disrupt the normal operation of the data storage drive when updating and activating a firmware update. This disruption may be even greater if the data storage drive is part of a larger storage subsystem, such as a RAID (Redundant Array of Independent Drives) subsystem or an automated data storage library.

What is needed is a method to perform and activate a data storage drive firmware update without disrupting the normal operation of that data storage drive or the storage subsystem that contains the data storage drive.

SUMMARY OF THE INVENTION

Applicant's invention includes an apparatus and method to activate a code update for a data storage drive. The method provides a code update to the data storage drive while the data storage drive performs normal drive operations. The method then detects a host computer transparent event, and activates the code update during that host computer transparent event.

For a more detailed understanding of the present invention, reference may be made to the following detailed description taken in conjunction with the accompanying drawings.

DETAILED DESCRIPTION OF THE PREFERRED EMBODIMENTS

This invention is described in preferred embodiments in the following description. The preferred embodiments are described with reference to the Figures. The invention will be described as embodied in a data storage drive disposed in a data storage and retrieval system. The following description of Applicant's method to transparently perform and activate firmware updates in a data storage drive is not meant, however, to limit Applicant's invention to data processing applications, as the invention herein can be applied to updating firmware in a data storage device in general.

Figure 1:
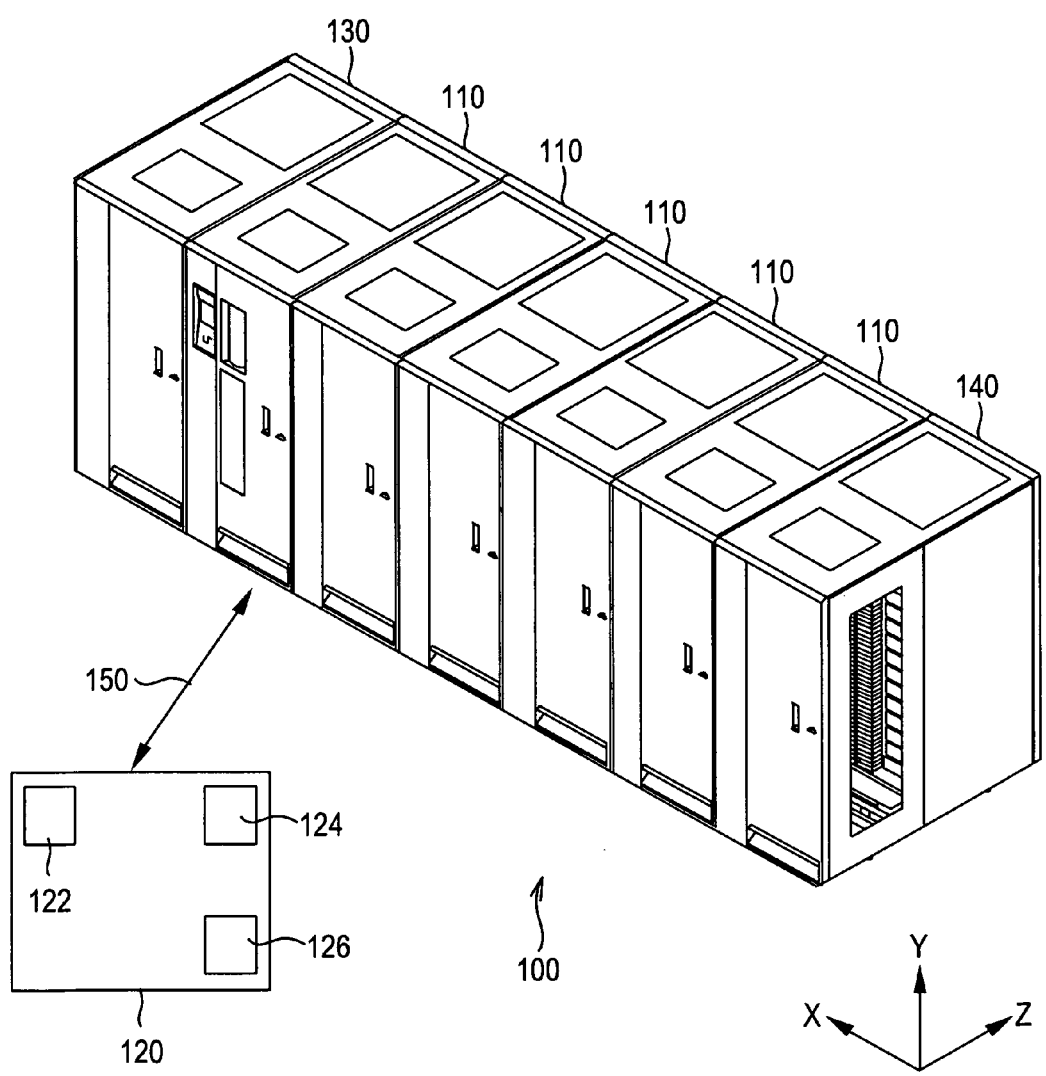
FIG. 1 is a perspective view of one embodiment of Applicants' automated data storage library.

FIG. 1 illustrates an automated data storage library 100 with left hand service bay 130, one or more storage frames 110, and right hand service bay 140. A frame comprises an expansion component of the library. Frames may be added or removed to expand or reduce the size and/or functionality of the library. Frames may comprise storage shelves, one or more data storage drives, import/export stations, accessors, operator panels, and controllers.

In the illustrated embodiment of FIG. 1, automated data storage library 100 is interconnected with host computer 120 via communication link 150. Although FIG. 1 shows a single host computer, in other embodiments Applicants' library 100 is capable of communicating with a plurality of host computers.

Host computer 120 comprises a computer system, such as a mainframe, personal computer, workstation, and combinations thereof, including an operating system 122 such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 120 includes a storage management program 124. The storage management program 124 in the host computer 120 may include the functionality of storage management type programs known in the art that manage the transfer of data to a data storage and retrieval system, such as the IBM DFSMS implemented in the IBM MVS operating system.

The IBM DFSMS software is described in "z/OS V1R3 DFSMS Introduction," IBM document no. SC26-7397-01, which document is incorporated herein by reference in its entirety. Storage management program 124 may include known storage management program functions, such as recall and migration. The storage management program 124 may be implemented within the operating system 122 of the host computer 120 or as a separate, installed application program. Alternatively, storage management program 124 may include device drivers, backup software, application programs 126, and the like.

In certain embodiments, communication link 150 is selected from the group consisting of a serial interconnection, such as RS-232 or RS-422, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, or other interconnections and/or protocols as is known to those of skill in the art.

Figure 2:
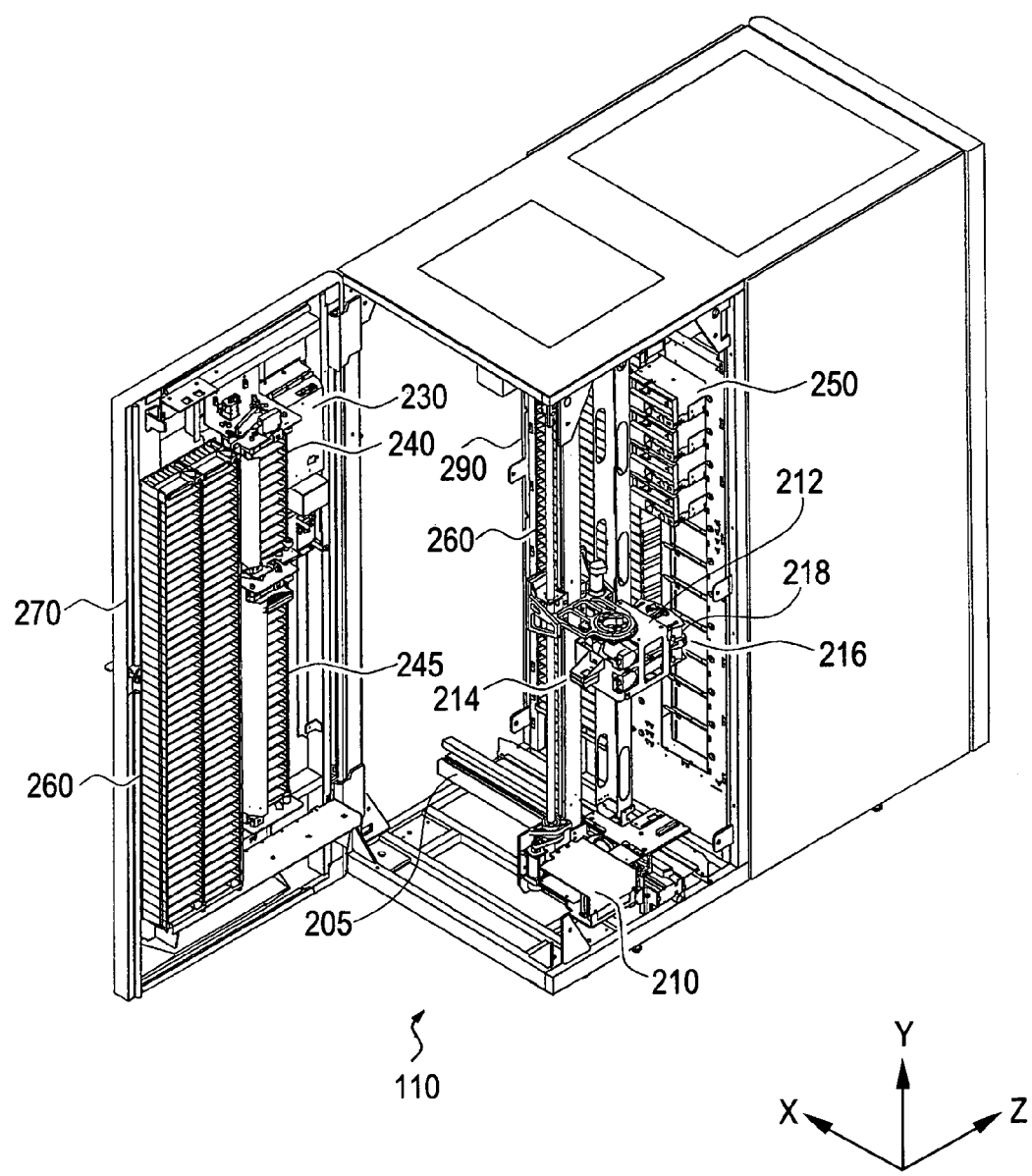
FIG. 2 is a perspective view of the minimum configuration of Applicants' automated data storage library.

FIG. 2 shows one embodiment of storage frame 110. A single storage frame 110 comprises one embodiment of Applicants' library 100. In this single frame embodiment, Applicants' library comprises no redundant accessors and no service bays.

Frame 110 is arranged for accessing portable data storage media in response to commands from one or more host systems, such as host computer 120 (FIG. 1). Frame 110 includes a plurality of storage shelves 260, on front wall 270 and rear wall 290, for storing portable data storage cartridges that contain data storage media. Frame 110 further includes at least one data storage drive 250 for reading and/or writing data with respect to the data storage media, and at least one accessor 210 for transporting the data storage media between the plurality of storage shelves 260 and the data storage drive(s) 250. The storage frame 110 may optionally comprise an operator panel 230 or other user interface, such as a web-based interface, which allows a user to interact with the library. Storage frame 110 may optionally comprise an upper import/export station 240 and/or a lower import/export station 245, which allows data storage media to be inserted into the library and/or removed from the library without disrupting library operation.

Accessor 210 comprises lifting servo section 212 which is capable of bidirectional movement along the vertical Y axis. Accessor 210 further comprises at least one gripper assembly 216 for gripping one or more data storage media. In the illustrated embodiment of FIG. 2, accessor 210 further includes a bar code scanner 214 or other reading system, such as a smart card reader or similar system, to "read" identifying information about the data storage media. In the illustrated embodiment of FIG. 2, accessor 210 further includes a second gripper mechanism 218 disposed on lifting servo section 212.

Library 100 may comprise one or more storage frames 110, each having storage shelves 260 accessible by accessor 210. Accessor 210 moves bidirectionally along the horizontal X axis on rail 205. In embodiments of library 100 which comprise multiple frames, the rail 205 in each of those individual frames are aligned such that accessor 210 may travel from one end of the library to the opposite end along a contiguous rail system. For example and referring again to FIG. 1, accessor 210 is capable of bidirectional movement along the X axis from service bay 130, through the plurality of frames 110, to the service bay 140.

Figure 3:
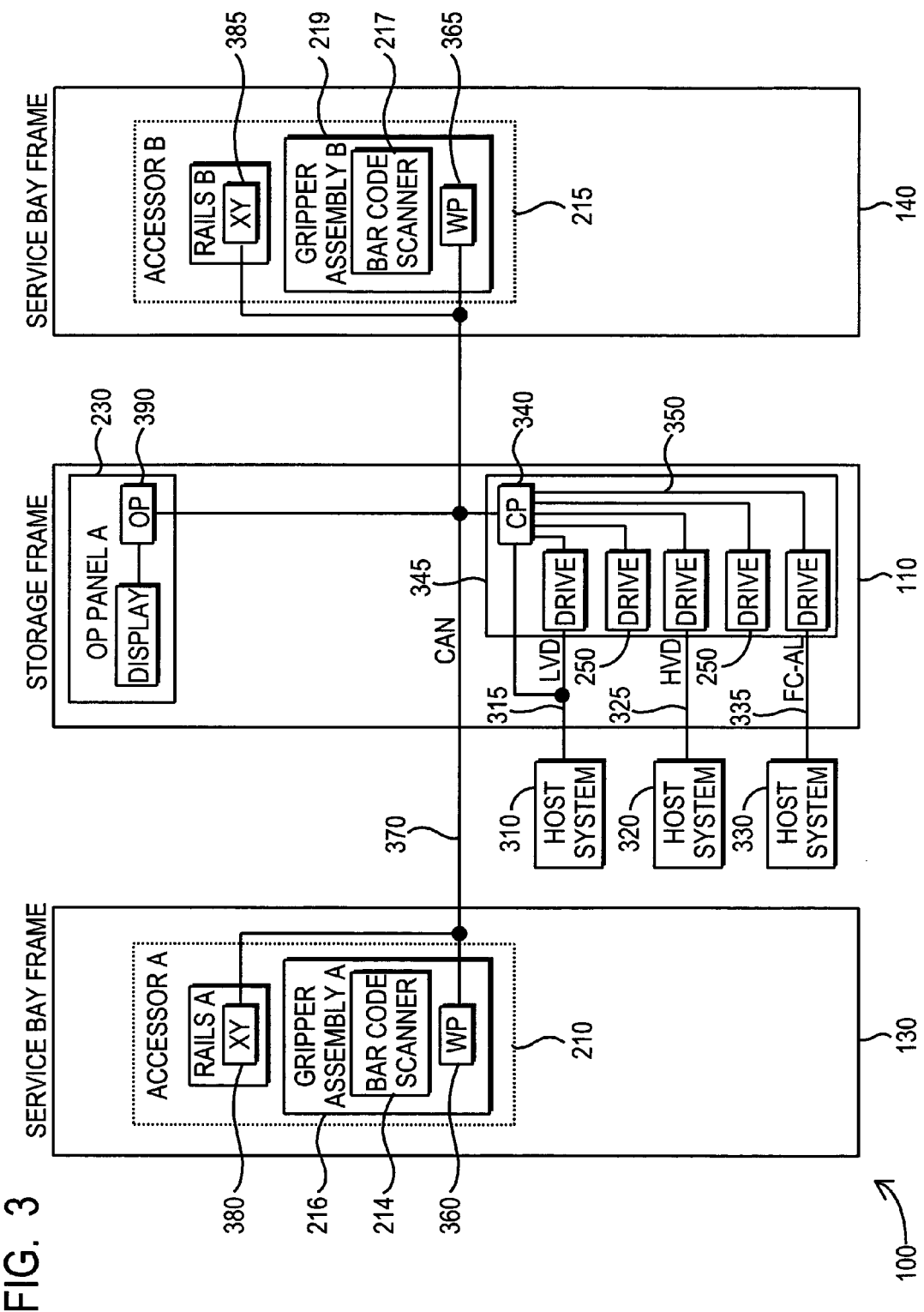
FIG. 3 is a block diagram illustrating another embodiment of Applicants' automated data storage library which employs a distributed system of modules with a plurality of processor nodes.

FIG. 3 shows a block diagram of certain components of one embodiment of Applicants' automated data storage library 100. The illustrated embodiment of FIG. 3 employs a distributed system of modules with a plurality of processor nodes. An example of such an automated data storage library comprises the IBM 3584 UltraScalable Tape Library. The library of FIG. 3 comprises one or more storage frames 110, a left hand service bay 130 and a right hand service bay 140.

The left hand service bay 130 is shown including accessor 210. As discussed above, accessor 210 comprises a gripper assembly 216 and, optionally, reading system 214 to "read" identifying information about the data storage media. The right hand service bay 140 is shown with a second accessor 215. The second accessor 215 comprises a gripper assembly 219 and may include a reading system 217 to "read" identifying information about the data storage media. In the event of a failure or other unavailability of the accessor 210, or its gripper 216, etc., the second accessor 215 may perform all of the functions of the first accessor 210. The two accessors 210 and 215 may share one or more mechanical paths or they may comprise completely independent mechanical paths. In one example, the accessors 210 and 215 utilize a common horizontal rail with independent vertical rails. The first accessor 210 and the second accessor 215 are described as first and second for descriptive purposes only and this description is not meant to limit either accessor to an association with either the left hand service bay 130, or the right hand service bay 140.

First accessor 210 or second accessor 215 moves its gripper in at least two directions, called the horizontal "X" direction and vertical "Y" direction, to retrieve and grip, or to deliver and release the data storage media at the storage shelves 260 and to load and unload the data storage media at the data storage drives 250.

In the illustrated embodiment of FIG. 3, library 100 receives commands from one or more host systems 310, 320, and/ or 330. The host systems, such as host servers, communicate with the library directly via communication links 315, 325, and/or 335, respectively, to provide commands to access particular data storage media and move the media, for example, between the storage shelves 260 (FIG. 2) and the data storage drives 250 (FIGS. 2, 3). The commands are typically logical commands identifying the media and/or logical locations for accessing the media.

The illustrated embodiment of FIG. 3 comprises a distributed control system receiving the logical commands from hosts, determining the required actions, and converting the actions to physical movements of first accessor 210 and/or second accessor 215.

In certain embodiments, Applicants' distributed control system comprises a plurality of processor nodes, each having one or more processors. In certain embodiments, Applicants' distributed control system includes communication processor node 340 disposed in storage frame 110. Communication processor node 340 provides a communication link for receiving the host commands, either directly via link 315, 345 or through the drives 250, via link(s) 350.

In certain embodiments, communication processor node 340 is disposed in frame 110 adjacent to the data storage drives 250. In certain embodiments, Applicants' distributed processor system further comprises one or more work processor nodes. For example in the illustrated embodiment of FIG. 3, work processor node 360 is disposed on first accessor 210 and work processor node 365 is disposed on second accessor 215. Nodes 360 and 365 are each coupled to the communication processor node 340 via a network 370.

Each work processor node may respond to received commands that are broadcast to the work processor nodes from any communication processor node, and the work processor node may also direct the operation of, for example, first accessor 210, providing move commands. In certain embodiments, Applicants' distributed control system further includes XY processor node 380/385 disposed in accessor 210/215, respectively. The XY processor node 380 is coupled to the network 370 and positions the gripper 216.

In certain embodiments, Applicants' distributed control system further includes an operator panel processor node 390 disposed in the optional operator panel 230 (FIGS. 2, 3) for providing an interface for communicating between the operator panel and the communication processor node 340, work processor nodes 360/365, and the XY processor nodes 380/385.

Network 370 comprises a common bus coupling the various processor nodes. In certain embodiments, network 370 comprises a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art.

The communication processor node 340 is coupled to each of the data storage drives 250 via communication links 350, communicating with the drives and with host systems 310, 320 and 330. Alternatively, the host systems may be directly coupled to the communication processor node 340, at communication link 315, 345 for example, or to control port devices (not shown) which connect the library to the host system(s) with a library interface similar to the drive/library interface. As is known to those of skill in the art, various communication arrangements may be employed for communication with the hosts and with the data storage drives. In certain embodiments, communication links 315 and 325 are SCSI busses. Communication link 335 comprises a Fiber Channel-Arbitrated Loop which is a high speed serial data interface, allowing transmission over greater distances than the SCSI bus systems.

In certain embodiments, data storage drives 250 are disposed in close proximity to the communication processor node 340, and employ a short distance communication scheme, such as SCSL or a serial connection, such as RS-422. The data storage drives 250 are thus individually coupled to the communication processor node 340 by means of links 350. Alternatively, they may be coupled to processor node 340 through a common bus.

Additional storage frames 110 may be provided and each is coupled to the adjacent storage frame. Any of the storage frames 110 may comprise communication processor nodes 340, storage shelves 260, data storage drives 250, and networks 370.

In FIG. 3 and the accompanying description, the first and second accessors are associated with the left hand service bay 130 and the right hand service bay 140. This is for illustrative purposes and there may not be an actual association. In certain embodiments, Applicants' library 100 does not include left hand service bay 130 and/or right hand service bay 140.

Figure 4:
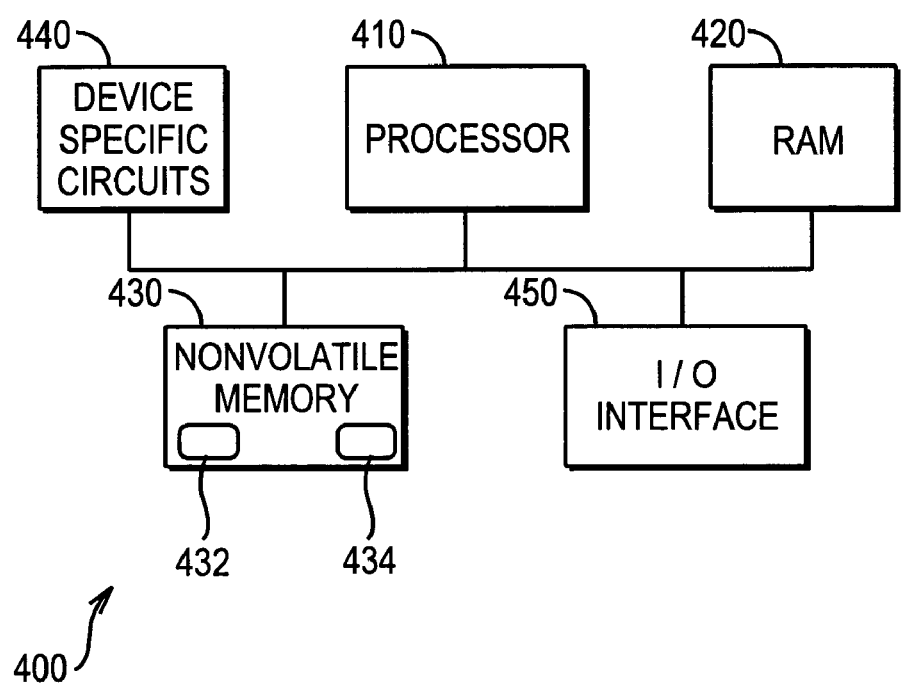
FIG. 4 is a block diagrammatic representation of a drive controller.

Applicants' data storage drive comprises one or more controllers to direct the operation of that data storage drive. Such one or more controllers may take many different forms and may comprise an embedded system, a distributed control system, a personal computer, workstation, etc. FIG. 4 shows one embodiment of Applicants' data storage drive controller 400. Controller 400 includes a processor 410, RAM (Random Access Memory) 420, nonvolatile memory 430, device specific circuits 440, and I/O interface 450. Alternatively, the RAM 420 and/or nonvolatile memory 430 may be contained in the processor 410 as could the device specific circuits 440 and I/O interface 450.

Processor 410 may comprise an off the shelf microprocessor, custom processor, FPGA (Field Programmable Gate Array), ASIC (Application Specific Integrated Circuit), discrete logic, etc. The RAM (Random Access Memory) 420 is typically used to hold variable data, stack data, executable instructions, etc. The nonvolatile memory 430 may comprise any type of nonvolatile memory such as EEPROM (Electrically Erasable Programmable Read Only Memory), flash PROM (Programmable Read Only Memory), battery backup RAM, hard disk drive, etc.

The nonvolatile memory 430 is typically used to hold the executable firmware 432 and any nonvolatile data. The I/O interface 450 is a communication interface that allows the processor 400 to communicate with devices external to the controller. Examples may comprise serial interfaces such as RS-232 or USB (Universal Serial Bus), SCSI (Small Computer Systems Interface), Fibre Channel, etc.

The device specific circuits 440 provide additional hardware to enable the controller 400 to perform unique functions. The device specific circuits 440 may comprise, for example, electronics that provide Analog to Digital Conversion (ADC), Digital to Analog Conversion (DAC), and the like. In addition, all or part of the device specific circuits 440 may reside outside the controller 400. The controller of FIG. 4 may also comprise the controller of a storage subsystem, a host computer, an interconnect component, and the like.

Figure 5A:
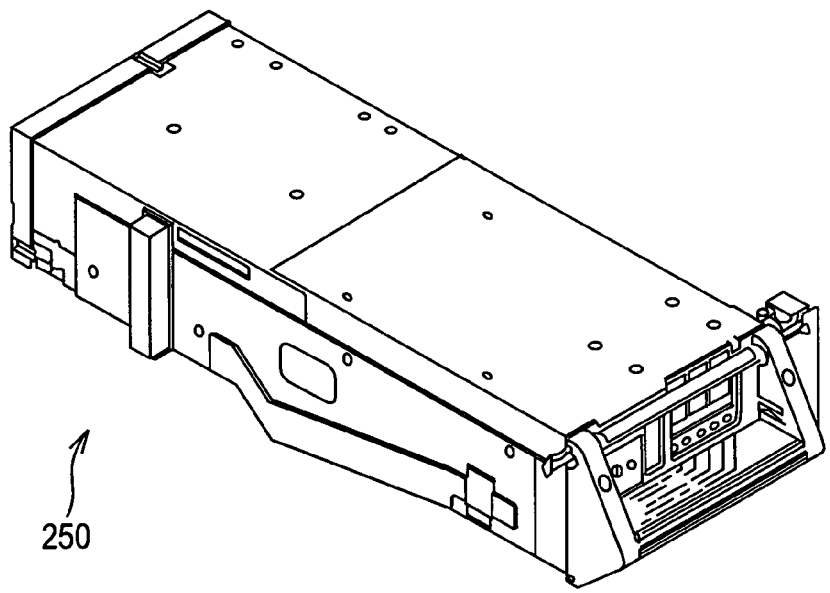
FIG. 5A is a first perspective view of one embodiment of Applicants' data storage drive mounted in a drive canister.
Figure 5B:
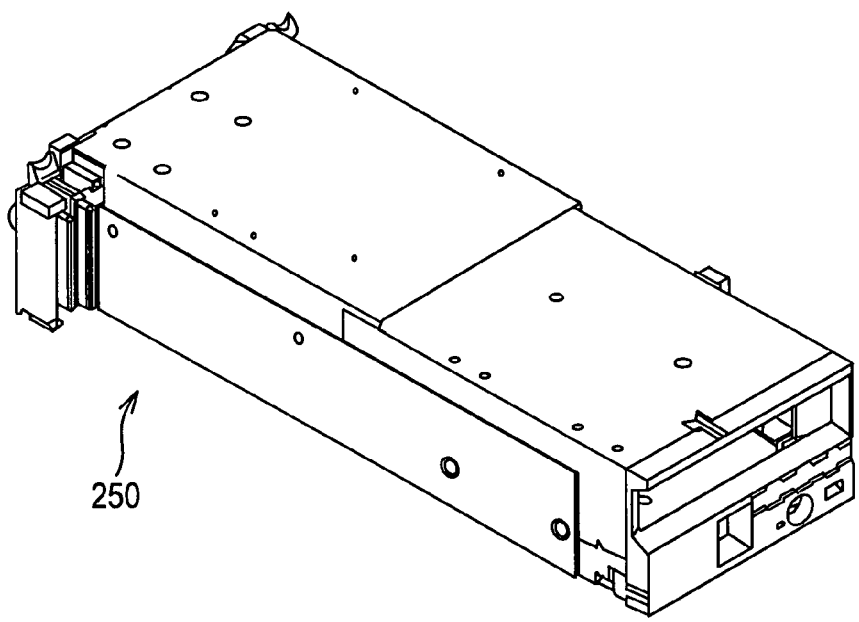
FIG. 5B is a second perspective view of one embodiment of Applicants' data storage drive mounted in a drive canister.

FIG. 5A shows a rear view of one embodiment of data storage drive 250, and FIG. 5B shows a front view of that embodiment. In the illustrated embodiment of FIGS. 5A and 5B, drive 250 comprises a removable media LTO (Linear Tape Open) tape drive mounted in a hot swap canister. As a general matter, the data storage drive of this invention may comprise any removable media drive such as magnetic or optical tape drives, magnetic or optical disk drives, electronic media drives, or any other removable media drive as is known in the art. In addition, the data storage drive of this invention may comprise any fixed media drive such as hard disk drives or any other fixed media drive as is known in the art.

Applicants' invention includes a method to update the firmware, such as firmware 432 (FIG. 4), disposed in data storage drive 250 (FIGS. 2, 3, 5A, 5B).

Figure 6:
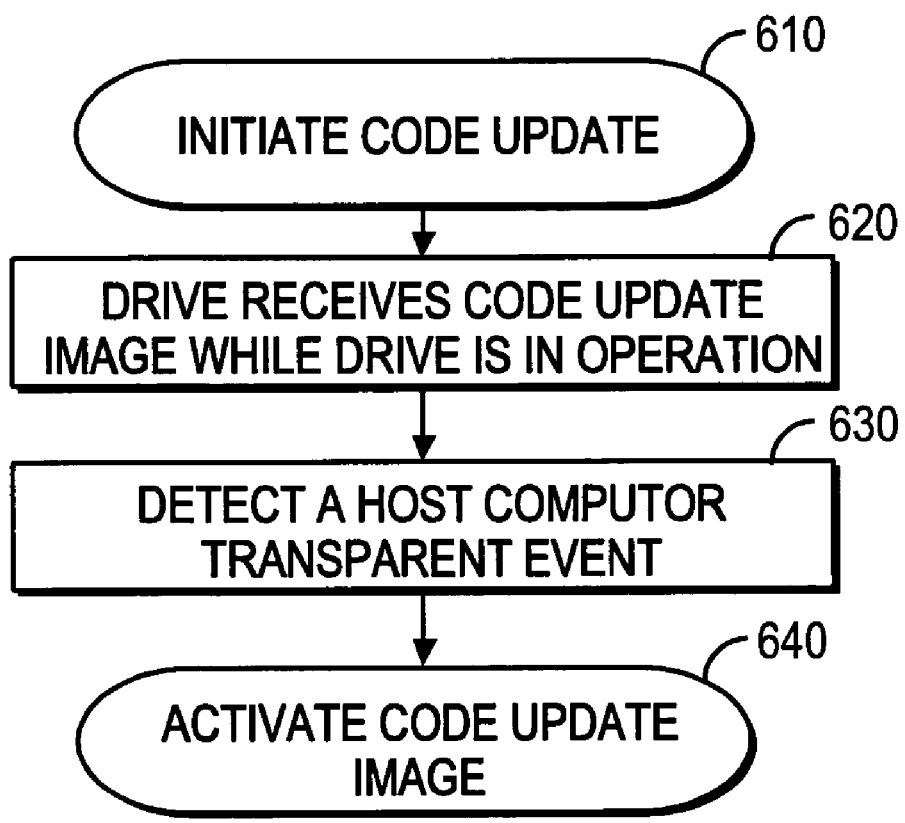
FIG. 6 is a flow chart summarizing the initial steps of Applicants' method.

FIG. 6 summarizes the steps of Applicants' method. Referring now to FIG. 6, in step 610 Applicants' method initiates a code update for a data storage drive, such as data storage drive 250.

In certain embodiments, step 610 is performed by a host computer, such as host computer 120 (FIG. 1)/310 (FIG. 3)/320 (FIG. 3)/330 (FIG. 3). In certain embodiments, step 610 is performed by an application running on a host computer, such as application 126. In certain embodiments, step 610 is performed by an HSM program, such as HSM program 124. In certain embodiments, step 610 is performed by a device driver, a storage system, a RAID driver, and/or an external computer. In certain embodiments, step 610 is performed by a subsystem controller, such as subsystem controller 340 (FIG. 3). In certain embodiments, step 610 is performed by a system user via an operator panel or a web user interface.

In step 620, Applicants' method provides the code update image to the data storage drive while that drive is in normal operation.

In certain embodiments, the code update image of step 620 comprises a single operational code image. For example, the code update image may completely replace the operational code inside the drive. In other embodiments, the code update image of step 620 comprises multiple code images. For example, the drive may comprise multiple operational code areas where each area provides a particular service or function. The code update image may replace one or more of these operational code areas. In yet other embodiments, the code update image comprises a partial code image. For example, the code update image may provide a patch or modification to an operational code area within the drive. Code update image, update image, and code image may comprise one or more code images or may comprise a partial code image.

The code update image may be received through a host interface, a subsystem interface, or some other interface associated with the drive. The interface may comprise an RS-232 interface, USB (Universal Serial Bus), Firewire, Ethernet, SCSI (Small Computer Systems Interface), Fibre Channel or any other communications interface known to those of skill in the art. In addition, the interface may comprise a wireless interface such as infrared, optical, inductive, RF (Radio Frequency) or any other wireless interface known to those of skill in the art.

The drive performs normal drive operation while receiving the code update image at step 620. By "performs normal drive operation," Applicants mean reading and/or writing data to/from data storage media and/or executing other drive commands.

In step 630, Applicants' method detects a host computer transparent event. Herein, a host computer transparent event is an event that the drive can use to hide the activation of a code update such that it is transparent to the host computer. In certain embodiments, the host computer transparent event of step 630 comprises a data storage drive reset. In certain embodiments, the host computer transparent event of step 630 comprises a data storage drive power cycle. In certain embodiments, the host computer transparent event of step 630 comprises receiving a suitable host command. In certain embodiments, step 630 additionally comprises transferring the identity of the data storage drive to another storage subsystem component such as a data storage drive 250 (FIGS. 2, 3, 5A, 5B), subsystem controller 340 (FIG. 3), etc. The detection of a host computer transparent event in step 630 may not comprise any logic that actually detects the event. For example, a drive reset may cause the activation of step 640 rather than any particular detection of the reset itself. In addition, a storage subsystem may be seen as a host or host computer to the data storage drive. In a similar manner, an interconnect component may be seen as a host or host computer to the storage subsystem or the data storage drive. Herein, host and host computer comprises any controller connected to the specified device.

Applicants' method transitions from step 630 to step 640 wherein the method activates the code update during the host computer transparent event of step 630. By updating the firmware while the drive performs normal operation and by activating the code update during a host computer transparent event, the code update becomes transparent or non-disruptive.

Figure 7:
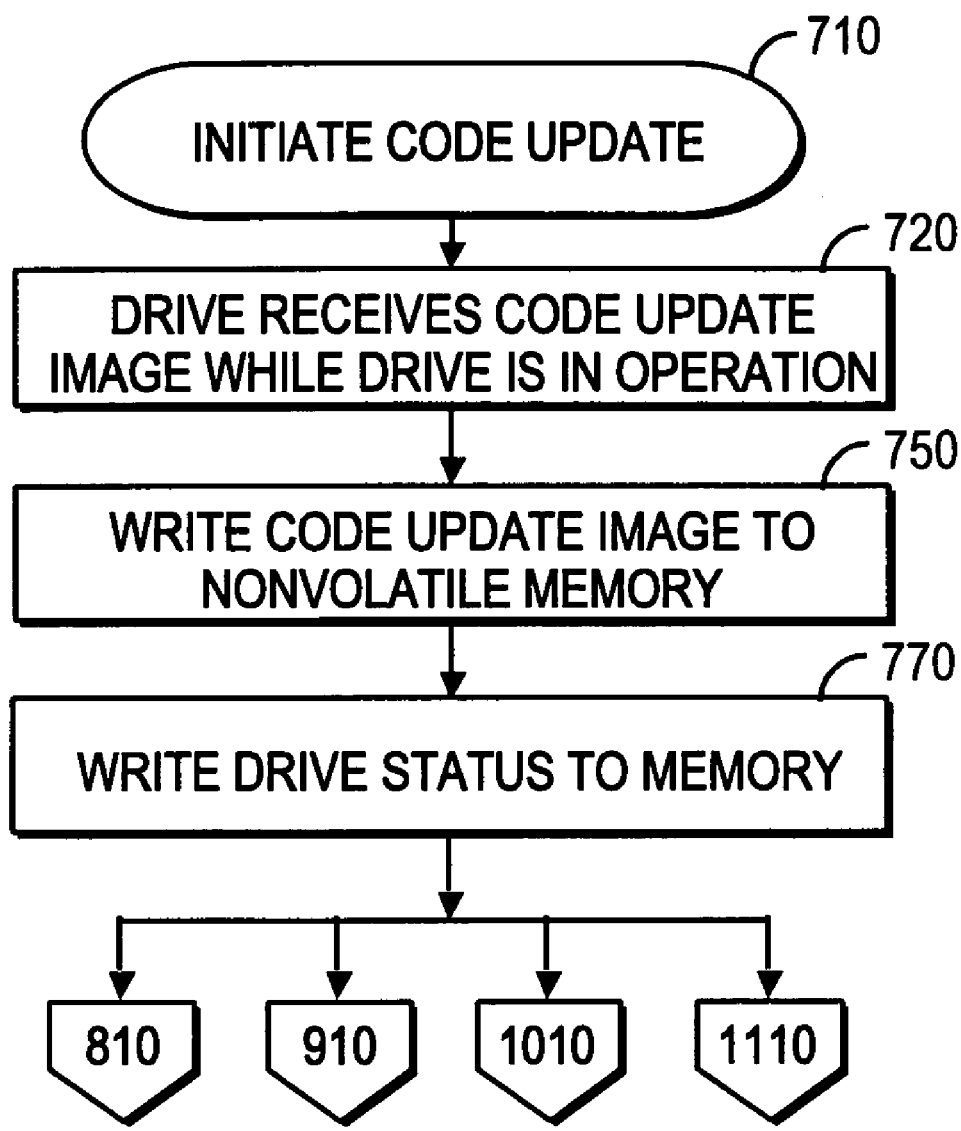
FIG. 7 is a flow chart showing additional steps in one embodiment of Applicants' method.

FIG. 7 summarizes additional steps in Applicants' method. Referring now to FIG. 7, steps 710 and 720 are identical to steps 610 and 620, respectively, described above. At step 750 the code update image is optionally written to nonvolatile memory. This is an optional step because the data storage drive may not contain nonvolatile memory for part or all of its operational code. For example, U.S. patent application Ser. No. 09/734,917, entitled "Code Image Distribution In A Multi-Node Network Of Processors," and assigned to the assignee hereof and hereby incorporated by reference herein, describes a method where part or all of a device's operational code is maintained in volatile memory and the device receives operational code through an interface every time the device is powered up.

Referring again to FIG. 7, the drive performs normal drive operation while writing the code update image to nonvolatile memory at step 750. U.S. patent application Ser. No. 10/083,784, entitled "Background Code Update For Embedded Systems," and assigned to the assignee hereof and hereby incorporated by reference herein, describes a method for receiving and/or writing a code update image while providing normal operation of the embedded system. In certain embodiments, steps 720 and 750 are performed using the method described in Ser. No. 10/083,784.

When present, the execution of step 750 may be intermixed with the execution of step 720. For example, the code update image may be written to nonvolatile memory while it is being received. U.S. Pat. No. 6,560,703, entitled "Redundant Updatable Self-Booting Firmware," and assigned to the assignee hereof and hereby incorporated by reference herein, describes a method for providing a redundant copy of firmware. The method described in the '703 patent reduces disruption by eliminating the need for service or human intervention should the code update image be corrupted or incomplete. The same is true if the receive of step 720 or the write of step 750 is disrupted. In certain embodiments, steps 720 and/or step 750 are performed using the method of the '703 patent.

In step 770, drive status information is optionally generated and saved by the drive. In certain embodiments, the drive status information is saved in nonvolatile memory. In certain embodiments, the drive status information is saved in a special area of volatile memory such that the subsequent activation of the new firmware image does not cause the status to be lost.

In certain embodiments, the drive status comprises information about the drive state. For example, the drive status may include information about the firmware update such that the drive can tell that a subsequent reset is the result of a non-disruptive firmware update, rather than some other reset. Such information may be necessary for preserving the non-disruptive nature of the drive firmware update because host reporting of a reset could be disruptive. In certain embodiments, Applicants' method transitions from step 770 to step 810, or to step 910, or to step 1010, or to step 1110.

Figure 11:
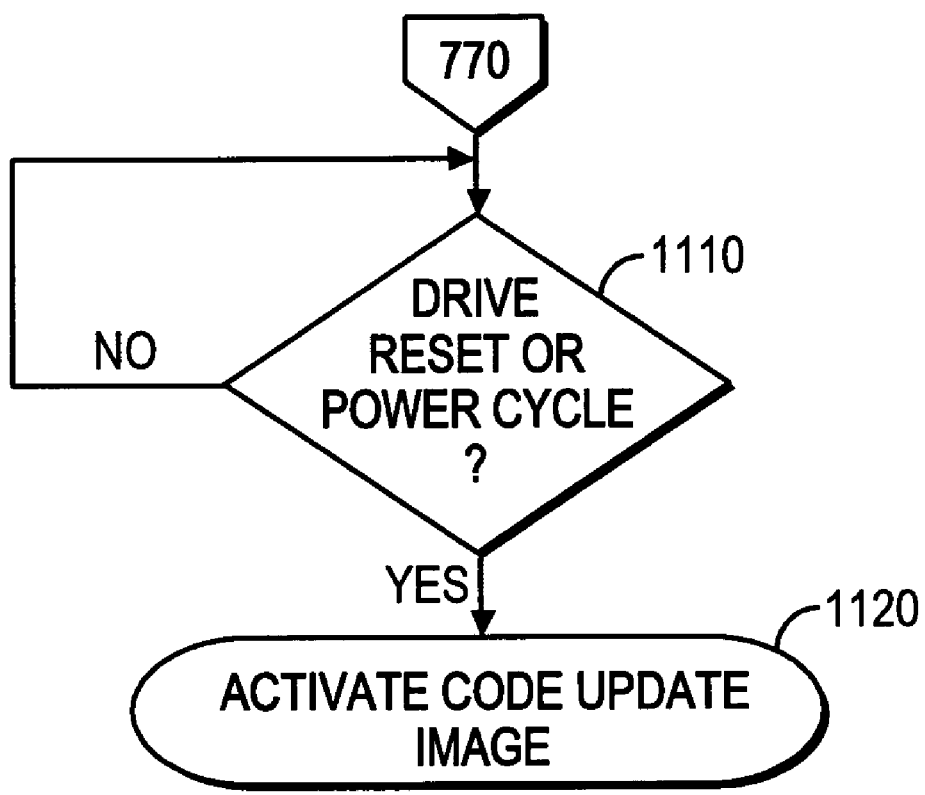
FIG. 11 is a flow chart showing additional steps in another embodiment of Applicants' method.

Referring now to FIG. 11, in one embodiment Applicants' method transitions from step 770 (FIG. 7) to step 1110 wherein the method determines if a drive reset or power cycle has occurred. Such a reset may comprise a power off/on sequence initiated by an operator, by a subsystem that contains the drive, by an interconnect component, by a host component, or by any other process that leads to loss of drive power.

Alternatively, the reset may comprise a reset that was not caused by a loss of power. For example, the drive may be connected to a SCSI or Fibre Channel interface and may receive a SCSI reset message. The drive may use this reset message as a directive to reset itself As another example, the SCSI parallel bus comprises a reset line and the drive may receive a reset through this line. Still further, the reset may comprise a command. For example, the drive may receive a command requesting that it perform a reset. The command may come over any interface associated with the drive. A drive reset may comprise a hardware reset, software reset, software branch, jump, or call.

In the event Applicants' method detects a drive reset or power cycle, then the method transitions from step 1110 to step 1120 wherein the method activates the code update image. By updating the drive firmware while the drive is performing normal operations and by holding off the activation of the code update image until a drive reset, disruption to the host system is avoided. The host computer assumes that the data storage drive is going through, or has gone through, a normal power on or reset while the drive is additionally activating the code update image.

In another embodiment of Applicants' method, the data storage drive waits until a command is received before activating the code update image. The command may comprise a read command, a write command, a media unload command, a media load command, and the like. In addition, when the data storage drive comprises a removable media drive the command may comprise a media load or unload operation without respect to an actual command. The drive may execute the command before or after activating the code update image but command status and/or data is not returned to the host until the code update image has been activated. In some applications, host computers do not issue commands to a data storage drive while another command is in process. In these cases, hiding the activation behind a command should be non-disruptive to the host computer.

Figure 8:
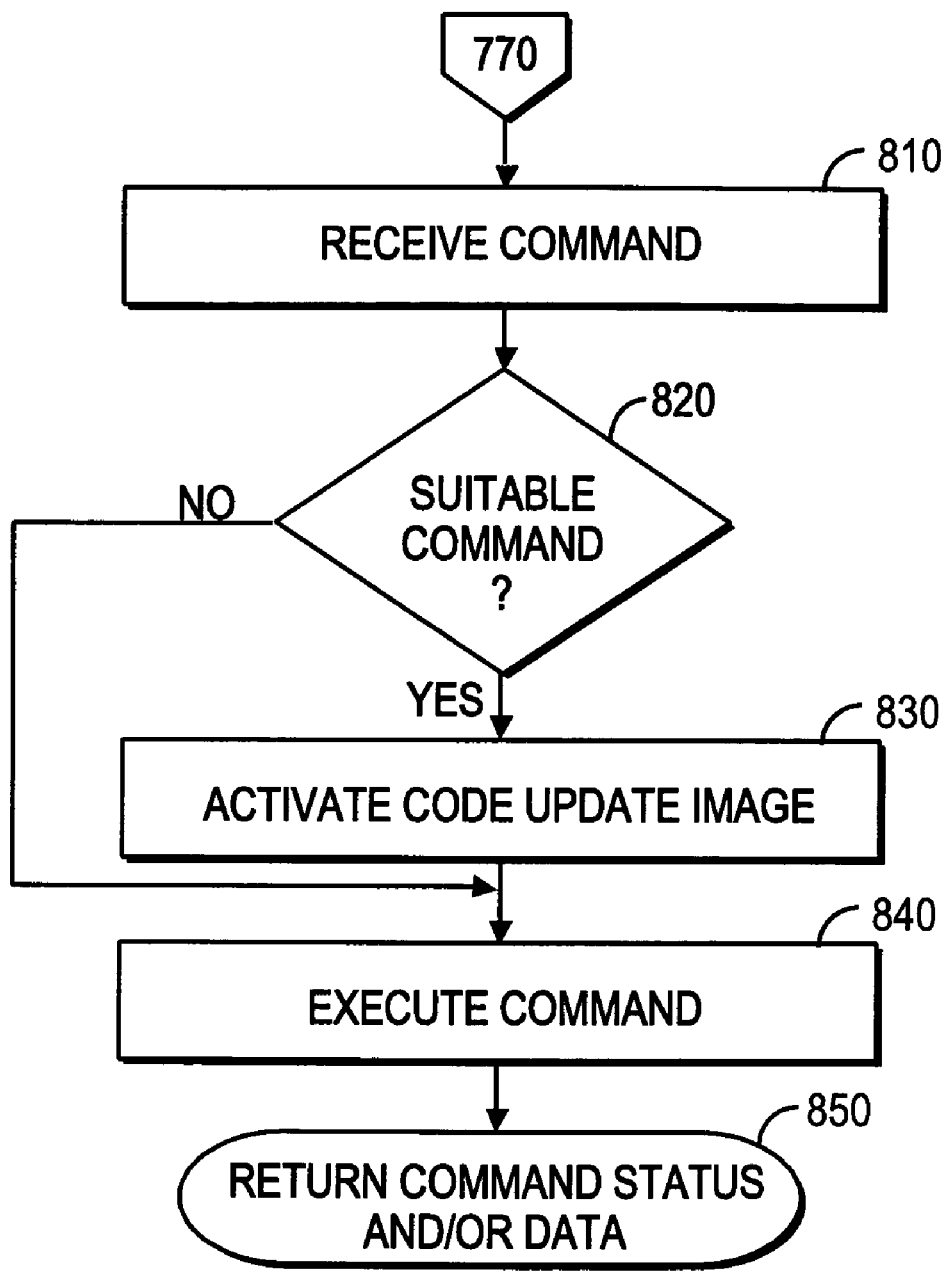
FIG. 8 is a flow chart showing additional steps in another embodiment of Applicants' method.

FIGS. 7 and 8 summarize the steps of this embodiment. The steps of FIG. 7 are described above. Referring now to FIG. 8, in step 810 the drive receives a command from one or more host computers. Applicants' method transitions from step 810 to step 820 wherein the method determines if the command is a suitable command for activating the code update image. In certain embodiments, step 820 is performed by a controller, such as controller 400, disposed in the data storage drive.

By "suitable command," Applicants mean a command that can be deferred long enough to complete the activation of the code update image without creating a host time-out or other host error. For example, a data read command generally has a longer host time-out than a drive status command. Thus, a suitable command comprises, for example, a command having an associated host time-out interval greater than the time required to activate the code update and perform the requested command.

If Applicants' method determines in step 820 that the command received in step 810 is not a suitable command with which to activate the code update, then the method transitions from step 820 to step 840 and continues. If on the other hand, Applicants' method determines in step 820 that the received command is a suitable command, then the method transitions from step 820 to step 830 wherein the drive activates the code update image. In certain embodiments, step 830 includes a hardware reset. In certain embodiments, step 830 includes a software reset. In certain embodiments, step 830 includes a software branch, jump or call. In certain embodiments, step 750 and/or step 770 is performed after step 820 and before step 830.

Applicants' method transitions from step 830 to step 840 wherein the method executes the command received at step 810. In certain embodiments, steps 830 and 840 are performed synchronously. In other embodiments, step 840 is performed prior to step 830. Applicants' method transitions from step 840 to step 850 wherein the method returns the command status and/or data from the command execution of step 840.

By deferring command execution and/or command status or data, the activation of the code update image is transparent to the host system. The host computer assumes that the data storage drive is executing the requested command while the drive is additionally activating the code update image.

In other embodiments of Applicants' method, the data storage drive comprises part of a storage subsystem. The storage subsystem may comprise an automated data storage library, a RAID (Redundant Array of Independent Drives) subsystem, a virtual tape system, or any other storage subsystem known in the art. The data storage drive receives a code update image while performing normal drive operations. The code update image may be received through a host computer interface, a subsystem interface, an interconnect component interface, or some other interface associated with the drive. The data storage drive optionally writes the code update image to nonvolatile memory while performing normal drive operations. The receive and write operations may be intermixed or they may occur sequentially. The data storage drive waits for a signal from the storage subsystem before activating the code update image. This signaling may comprise subsystem control of drive power or it may comprise communication between the storage subsystem and the drive.

In certain embodiments, Applicants' method transfers the identity of the data storage drive and defers host activity until the code update image has been activated. In these embodiments, a different component of the storage subsystem performs any necessary host responses on behalf of the drive, and/or includes having the subsystem defer transmission of commands between the storage subsystem and the drive.

Figure 9:
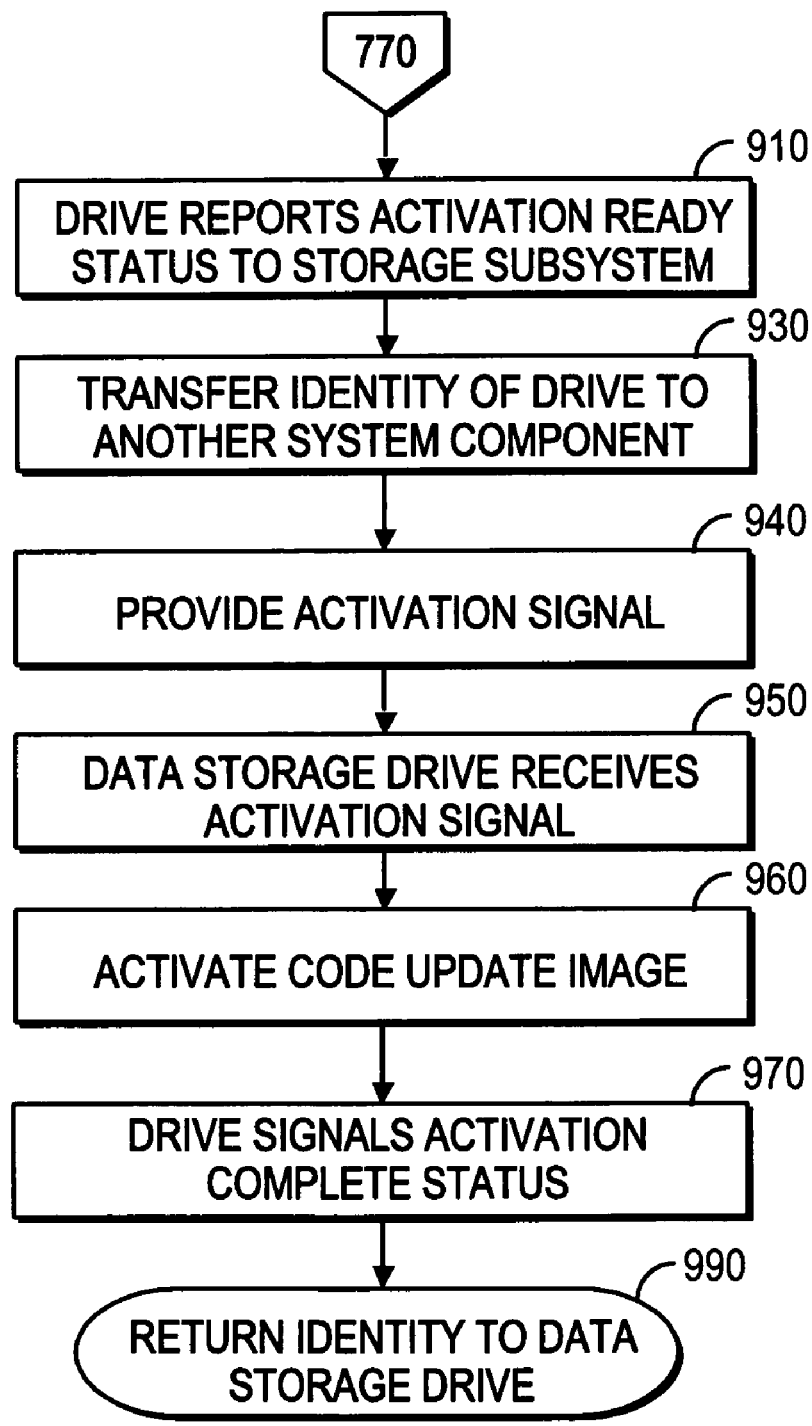
FIG. 9 is a flow chart showing additional steps in another embodiment of Applicants' method.

FIGS. 7 and 9 summarize the steps of this embodiment. The steps of FIG. 7 are described above. Referring now to FIG. 9, in step 910 the data storage drive reports to the storage subsystem that it is ready to activate the code update image. This reporting may comprise any signaling method known to those of skill in the art. For example, the data storage drive may be coupled to the storage subsystem through a communication interface. The data storage drive may send a message to the subsystem indicating that it is ready to activate the code update image. Alternatively, the storage subsystem may poll the drive for activation status.

Applicants' method transitions from step 910 to step 930 wherein the method optionally transfers the identity of the data storage drive to another storage subsystem component. For example, if the drive comprises a Fibre Channel device then the Fibre Loop ID and/or the World Wide Name could be transferred to another device that is capable of responding on the drive/host interface of the drive. The device that has taken the drive identity could respond to host commands or queries on behalf of the drive. In one example, the device uses a common SCSI ASC/ASCQ (Additional Sense Code/ Additional Sense Code Qualifier) to indicate that the drive is not ready but is in the process of becoming ready.

In certain embodiments, step 930 includes transferring the identity of the data storage drive to another data storage drive disposed in the storage subsystem. In certain embodiments, step 930 includes transferring the identity of the data storage drive to a host component. In certain embodiments, step 930 includes transferring the identity of the data storage drive to another storage subsystem component. Pending patent application Ser. No. 10/136,696, entitled "Apparatus and Method to Provide Data Storage Device Failover Capability," assigned to the common assignee hereof, describes a method to transfer the identity of a data storage device, and is hereby incorporated by reference.

Applicants' method transitions from step 930 to step 940 wherein the storage subsystem provides the data storage drive with an activation signal. In certain embodiments, the activation signal of step 940 comprises a reset or power cycle. For example, the storage subsystem may have the ability to control drive power or may have access to a drive reset line. The storage subsystem may cycle drive power or cause a reset when it knows that the drive is ready to activate the code update image. In other embodiments, the activation signal comprises any signaling method known to those of skill in the art.

Applicants' method transitions from step 940 to step 950 wherein the data storage drive receives the activation signal. In certain embodiments, the data storage drive is coupled to the storage subsystem through a communication interface. In certain of these embodiments, step 950 includes polling the storage subsystem by the data storage drive for activation status.

Applicants' method transitions from step 950 to step 960 wherein the drive activates the code update image. In certain embodiments, the activation of step 960 comprises a hardware reset, software reset, software branch, jump or call, or the like. In certain embodiments, steps 750 and/or 770 may be performed anywhere between steps 720 and 960.

Applicants' method transitions from step 960 to step 970 wherein the data drive reports to the storage subsystem a completed activation of the code update image. This reporting may comprise any signaling method known to those of skill in the art. For example, the data storage drive may be coupled to the storage subsystem through a communication interface. The data storage drive may send a message to the subsystem indicating that it has completed activation of the code update image. Alternatively, the storage subsystem may poll the drive for activation completion. Still further, the reporting may comprise an implied signal through inference. For example, if activating the code update image comprises a reset of the drive then the storage subsystem can infer that the activation has completed if it can detect that the drive has gone through a reset.

Applicants' method transitions from step 970 to step 990 wherein the method returns the optional identity, from step 930, to the data storage drive. By updating the firmware while the drive performs normal operation and by transferring the identity of the data storage drive to another component, the code update becomes transparent or non-disruptive.

In certain subsystem-related embodiments, the storage subsystem instructs the drive to activate the code update image upon receipt of a suitable host command. The host command may comprise a command to move a cartridge to or from the drive, may comprise a read or write command to the storage subsystem, or may comprise any other storage subsystem or drive command.

Figure 10:
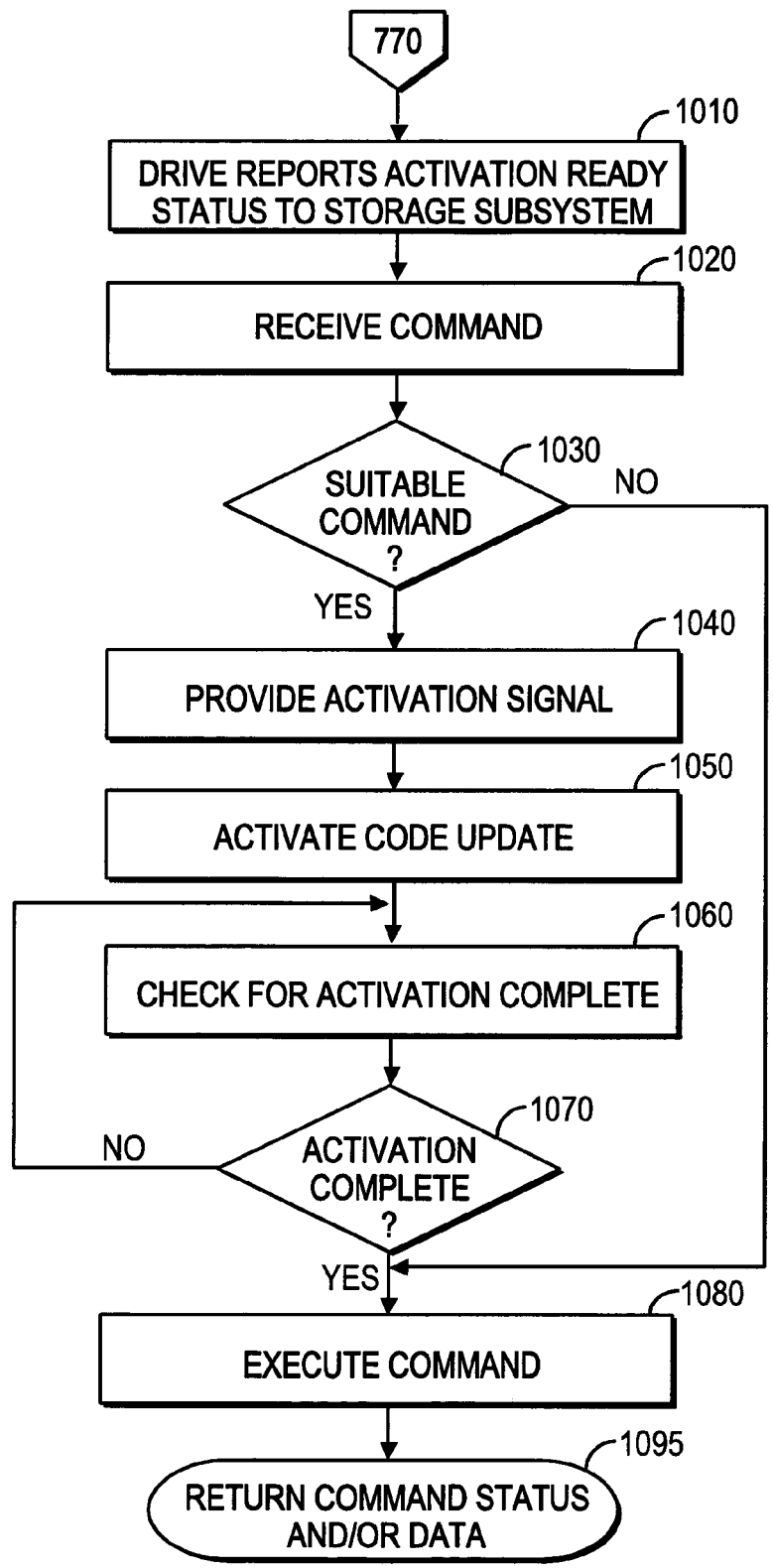
FIG. 10 is a flow chart showing additional steps in another embodiment of Applicants' method.

FIGS. 7 and 10 summarize the steps of these embodiments. The steps of FIG. 7 are described above. Referring now to FIG. 10, in step 1010 the data storage drive reports it is ready to activate the code update image. This reporting may comprise any signaling method known to those of skill in the art. For example, the data storage drive may be coupled to the library through a communication interface. The data storage drive may send a message to the storage subsystem indicating that it is ready to activate the code update image. Alternatively, the storage subsystem may poll the drive for activation status.

In step 1020, the storage subsystem receives a host command. The host command is sent through a host computer interface, an interconnect component interface, or some other interface associated with the storage subsystem. The interface may comprise an RS-232 interface, USB (Universal Serial Bus), Firewire, Ethernet, SCSI (Small Computer Systems Interface), Fibre Channel or any other communications interface known to those of skill in the art. In addition, the interface may comprise a wireless interface such as infrared, optical, inductive, RF (Radio Frequency) or any other wireless interface known to those of skill in the art.

Applicants' method transitions from step 1020 to step 1030 wherein the storage subsystem determines if the command received in step 1020 is a suitable command for hiding the activation of the drive code update image. For example, a simple status command may be less suitable for hiding the activation of the code update image than a data access command or a move medium command.

If Applicants' method determines that the command is not a suitable command for hiding the activation of the code update image, then the method transitions from step 1030 to step 1080 and continues. If on the other hand, Applicants' method determines in step 1030 that the command is a suitable command, then Applicants' method transitions from step 1030 to step 1040 wherein the method provides an activation signal to the data storage drive.

The activation signal of step 1040 may comprise any signaling method known to those of skill in the art such as a reset or power cycle. For example, the storage subsystem may have the ability to control drive power or may have access to a drive reset line. The storage subsystem may cycle drive power or cause a reset when it is ready to activate the code update image. The activation signal may comprise a communication. For example, the data storage drive may be coupled to the storage subsystem through a communication interface. The storage subsystem may send a message to the drive indicating that it should activate the code update image. Alternatively, the drive may poll the storage subsystem for this signal. In certain embodiments, step 750 and/or 770 may be performed anywhere between steps 720 and 1050.

In step 1050, the data storage drive activates the code update image. While the drive is activating the code update image, the storage subsystem is holding off command execution or command status or both. In this way, the code update image activation is hidden from the host computer behind a host command received or intercepted by the storage subsystem. If the storage subsystem comprises an automated data storage library then the storage subsystem may hold off the status from a host command that directs cartridge movement to/from the drive.

Applicants' method transitions from step 1050 to step 1060 wherein the storage subsystem checks for an activation complete signal from the drive. The activation complete signal may comprise the detection that the drive has completed a reset or power cycle. Alternatively, the activation complete signal may comprise any signaling method known to those of skill in the art. For example, the data storage drive may be coupled to the storage subsystem through a communication interface. The drive may send a message to the storage subsystem indicating that it has completed activating the code update image. Alternatively, the storage subsystem may poll the drive for this signal.

Applicants' method transitions from step 1060 to step 1070 wherein the method determines if an activation complete signal is detected. If Applicants' method determines in step 1070 that an activation complete signal is not detected, then the method transitions from step 1070 to step 1060 and continues.

If on the other hand, Applicants' method determines in step 1070 that the activation has completed, then the method transitions from step 1070 to step 1080 wherein the storage subsystem executes the command or forwards the command to the drive for execution. Alternatively, step 1080 may be executed anywhere between steps 1020 and 1095 because the command status and/or data of step 1095 may be used to hide the activation of the code update image.

Applicants' method transitions from step 1080 to step 1095 wherein the storage subsystem returns command status and/or data to the host computer. By hiding the activation of the drive code update image behind a host command, the activation of the code update image is transparent to the host system. The host computer assumes that the storage subsystem or drive is executing the requested command while the drive is actually activating the code update image.

In other embodiments, a data storage drive and/or an associated storage subsystem is coupled to an interconnect component. An interconnect component is used to expand the capabilities of a drive or storage subsystem or to expand the capabilities of the network that connects the drive or subsystem to one or more host computers. For example, an interconnect component may provide additional drive or subsystem functionality such as partitioning or virtualization. In another example, an interconnect component may provide additional network functionality such as Fibre Channel ports, Fibre Channel to SCSI conversion, SAN data gateway connectivity, etc. The data storage drive receives a code update image while performing normal drive operations. The code update image may be received through a host computer interface, a subsystem interface, an interconnect component interface, or some other interface associated with the drive. The data storage drive optionally writes the code update image to nonvolatile memory while performing normal drive operations. The receive and write operations may be intermixed or they may occur sequentially. The interconnect component signals the drive to activate the code update image. This signaling may comprise control of drive power or it may comprise communication from the interconnect component to the drive.

In one embodiment, the interconnect component holds off commands that the drive or storage subsystem is incapable of handling while activating the code update image. This may comprise queuing of commands until the drive has completed activation of the code update image.

In another embodiment, the interconnect component takes over the identity of the data storage drive or storage subsystem and holds off host activity until the code update image has been activated. This may comprise a component associated with the interconnect component making any necessary host responses on behalf of the drive or storage subsystem. In certain embodiments the interconnect component responds on behalf of the drive or storage subsystem and holds off the host computer until the drive has activated the code update image. For example, in certain embodiments the interconnect component accepts a command and then passes that command on to the drive when it has completed activating the code update image. In addition, various responses could be used to hold off the host computer, as is known by those of skill in the art. In certain embodiments, the interconnect component utilizes a common SCSI ASC/ASCQ (Additional Sense Code/Additional Sense Code Qualifier) to indicate that the drive or subsystem is not ready but is in the process of becoming ready.

In certain embodiments, the interconnect component waits until a host command is received before instructing the drive to activate the code update image. The host command may comprise a read or write command to the storage subsystem or drive, may comprise a command to move a cartridge to or from the drive, or may comprise any other storage subsystem or drive command.

In certain embodiments, the data storage drive and/or storage subsystem is coupled to a host component. A host component may comprise any hardware or software component of a host computer. For example, a controller, host bus adapter, processor, device driver, application program, operating system, etc. The data storage drive receives a code update image while performing normal drive operations. The code update image may be received through a host computer interface, a subsystem interface, an interconnect component interface, or some other interface associated with the drive. The data storage drive optionally writes the code update image to nonvolatile memory while performing normal drive operations. The receive and write operations may be intermixed or they may occur sequentially. The host component signals the drive to activate the code update image while the host component prevents any host applications from being disrupted. This signaling may comprise control of drive power or it may comprise communication from the host component to the drive.

In certain embodiments, the host component holds off commands that the drive or storage subsystem is incapable of handling while activating the code update image. This may comprise queuing of commands until the drive has completed activation of the code update image.

In other embodiments, the host component takes over the identity of the data storage drive or storage subsystem and holds off host activity until the drive code update image has been activated. This may comprise the host component making any necessary responses on behalf of the drive or storage subsystem.

In certain embodiments, the host component waits until a host command is received before instructing the drive to activate the code update image. The host command may comprise a read or write command to the storage subsystem or drive, may comprise a command to move a cartridge to or from the drive, or may comprise any other storage subsystem or drive command.

In other embodiments, the host component takes on the identity of the data storage drive or storage subsystem while the drive is activating the code update image. For example, the data storage drive could be considered as a failed drive until the code update image has been activated. The host component would use another drive to take its place while the code update image is being activated. In another example, the host component could respond on behalf of the drive or subsystem and it would hold off the host computer until the drive has activated the code update image. The host component could accept a command and then pass it on to the drive when it has completed activating the code update image. In addition, various responses could be used to hold off the host computer, as is known by those of skill in the art. For example, there is a common SCSI ASC/ASCQ (Additional Sense Code/Additional Sense Code Qualifier) that the host component could use to indicate that the drive or subsystem is not ready but is in the process of becoming ready.

The embodiments of Applicants' method recited in FIGS. 6, 7, 8, 9, 10, and/or 11, may be implemented separately. Moreover, in certain embodiments, individual steps recited in FIGS. 6, 7, 8, 9, 10, and/or 11, may be combined, eliminated, or reordered.

Applicants' invention includes an article of manufacture comprising a computer useable medium, such as non-volatile memory 430 (FIG. 4), having computer readable program code disposed therein to perform and activate a code update for a data storage drive. In certain embodiments, the computer readable program code implements some or all of the steps of FIGS. 6, 7, 8, 9, 10, and/or 11.

Applicants' invention further includes a computer program product, such as computer program product 434 (FIG. 4) usable with a programmable computer processor having computer readable program code embodied therein method to perform and activate a code update for a data storage drive. In certain embodiments, the computer program product implements some or all of the steps of FIGS. 6, 7, 8, 9, 10, and/or 11.

While the preferred embodiments of the present invention have been illustrated in detail, the skilled artisan will appreciate that modifications and adaptations to those embodiments may be made without departing from the scope of the present invention as set forth in the following claims.

We claim:

1. A method to activate a code update for a data storage drive, comprising the steps of:
   receiving a code update at said data storage drive while said data storage drive reads and/or writes data to and/or from data storage media;
   receiving a host computer command;
   determining if said host computer command comprises an associated host time-out interval greater than the time required to activate the code update and perform the requested command;
   operative if said host computer command comprises an associated host time-out interval greater than the time required to activate the code update and perform the requested command, activating said code update; and
   performing said host computer command.

2. A method to activate a code update for a data storage drive, comprising the steps of:
   receiving a code update at said data storage drive while said data storage drive reads and/or writes data to and/or from data storage media, wherein said data storage drive comprises an identity, and wherein said data storage drive is disposed in a storage subsystem;
   transferring said identify to a second component disposed in said storage subsystem;
   activating said code update;
   returning said identity to said data storage drive from said second component.

3. The method of claim 2, wherein said second component is selected from the group consisting of a second data storage drive, a subsystem controller, a host component, an interconnect component, and combinations thereof.

4. The method of claim 2, wherein said data storage drive comprises a memory device, further comprising the step of writing said code update to said memory device.

5. The method of claim 2, wherein said data storage drive comprises a memory device, further comprising the steps of:
   generating drive status information;
   writing said drive status information to said memory device.

6. An article of manufacture comprising a computer useable medium having computer readable program code disposed therein to activate a code update for a data storage drive, the computer readable program code comprising a series of computer readable program steps to effect:
   receiving a code update at said data storage drive while said data storage drive reads and/or writes date to and/or from data storage media;
   receiving a host computer command;
   determining if said host computer command comprises an associated host time-out interval greater than the time required to activate the code update and perform the requested command;
   operative if said host computer command comprises an associated host time-out interval greater than the time required to activate the code update and perform the requested command, activating said code update; and
   performing said host computer command.

7. An article of manufacture comprising a computer useable medium having computer readable program code disposed therein to activate a code update for a data storage drive, wherein said data storage drive comprises an identity, and wherein said data storage drive is disposed in a storage subsystem, the computer readable program code comprising a series of computer readable program steps to effect:
   receiving a code update while said data storage drive reads and/or writes data to and/or from data storage media;
   transferring said identify to a second component disposed in said storage subsystem,
   activating said code update;
   returning said identity to said data storage drive from said second component.

8. The article of manufacture of claim 7, wherein said second component is selected from the group consisting of a second data storage drive, a subsystem controller, a host component, and interconnect component, and combinations thereof.

9. The article of manufacture of claim 7, wherein said data storage drive comprises a memory device, the computer readable program code comprising a series of computer readable program steps to effect writing said code update to said memory device while said data storage drive remains in normal operation.

10. The article of manufacture of claim 9, the computer readable program code comprising a series of computer readable program steps to effect:
    generating drive status information;
    writing said drive status information to said memory device.

11. A computer program product usable with a programmable computer processor having computer readable program code embodied therein to activate a code update for a data storage drive, comprising:
    computer readable program code which causes said programmable computer processor to receive a code update while said data storage drive reads and/or writes data to and/or from data storage media;
    computer readable program code which causes said programmable computer processor to receive a host computer command;
    computer readable program code which causes said programmable computer processor to determine if said host computer command comprises an associated host time-out interval greater than the time required to activate the code update and perform the requested command;
    computer readable program code which, if said computer command is suitable for said host computer transparent event, causes said programmable computer processor to activate said code update; and
    computer readable program code which causes said programmable computer processor to perform said host computer command.

12. A computer program product usable with a programmable computer processor having computer readable program code embodied therein to activate a code update for a data storage drive, comprising:

computer readable program code which causes said programmable computer processor to receive a code update while said data storage drive reads and/or writes data to and/or from data storage media, wherein said data storage drive comprises an identity, and wherein said data storage drive is disposed in a storage subsystem;

computer readable program code which causes said programmable computer processor to transfer said identify to a second component disposed in said storage subsystem, computer readable program code which causes said programmable computer processor to activate said code update;

computer readable program code which causes said programmable computer processor to receive said identity from said second component.

13. The computer program product of claim 12, wherein said second component is selected from the group consisting of a second data storage drive, a subsystem controller, a host component, and interconnect component, and combinations thereof.

14. The computer program product of claim 12, wherein said data storage drive comprises a memory device, further comprising computer readable program code which causes said programmable computer processor to write said code update to said memory device while said data storage drive remains in normal operation.

15. The computer program product of claim 12, wherein said data storage drive comprises a memory device, further comprising:

computer readable program code which causes said programmable computer processor to generate drive status information;

computer readable program code which causes said programmable computer processor to write said drive status to said memory device while said data storage drive remains in normal operation.

* * * * *